(12) United States Patent
Voege

(10) Patent No.: US 9,193,443 B2
(45) Date of Patent: Nov. 24, 2015

(54) AIR SUCKING VEHICLE TAIL SECTION COMPONENT OR WING SECTION COMPONENT, METHOD FOR PRODUCING AN AIR SUCKING VEHICLE TAIL SECTION COMPONENT AND A WING SECTION COMPONENT AND A VEHICLE, ESPECIALLY AN AIRCRAFT, WITH AN AIR SUCKING VEHICLE TAIL SECTION COMPONENT OR WING SECTION COMPONENT

(71) Applicant: Airbus Operations GmbH, Hamburg (DE)

(72) Inventor: Wolfgang Voege, Bremen (DE)

(73) Assignee: Airbus Operations GmbH (DE)

( * ) Notice: Subject to any disclaimer, the term of this patent is extended or adjusted under 35 U.S.C. 154(b) by 193 days.

(21) Appl. No.: 13/779,954

(22) Filed: Feb. 28, 2013

(65) Prior Publication Data

US 2013/0175402 A1 Jul. 11, 2013

Related U.S. Application Data

(63) Continuation of application No. PCT/EP2011/064226, filed on Aug. 18, 2011.

(60) Provisional application No. 61/379,509, filed on Sep. 2, 2010.

(30) Foreign Application Priority Data

Sep. 2, 2010 (DE) .......................... 10 2010 036 154

(51) Int. Cl.
*B64C 21/06* (2006.01)
*B64C 3/26* (2006.01)
*B64C 3/00* (2006.01)

(52) U.S. Cl.
CPC . *B64C 21/06* (2013.01); *B64C 3/00* (2013.01); *B64C 3/26* (2013.01); *Y02T 50/166* (2013.01); *Y10T 29/49826* (2015.01)

(58) Field of Classification Search
CPC ................. B64D 2045/0095; B64D 2033/022; B64C 3/28; B64C 21/06; B64C 21/08; B64C 21/02
USPC .................... 244/209, 200, 200.1, 204, 204.1
See application file for complete search history.

(56) References Cited

U.S. PATENT DOCUMENTS 1,553,695 A * 9/1925 Junkers ..................... 244/123.12
2,833,492 A * 5/1958 Fowler .......................... 244/209

(Continued)

FOREIGN PATENT DOCUMENTS

EP 1699686 A1 9/2006
EP 1749740 A1 2/2007
WO 9221560 A1 12/1992

*Primary Examiner* — Tien Dinh
*Assistant Examiner* — Alexander B Giczy
(74) *Attorney, Agent, or Firm* — Lerner, David, Littenberg, Krumholz & Mentlik, LLP

(57) ABSTRACT

An air-sucking vehicle tail section component or wing section component includes an outer delimitation part having microperforation including boreholes, and inner delimitation part having a plurality of suction boreholes including fluid connections to the microperforation boreholes, and connecting elements. The inner delimitation part is connected via the connecting elements to the outer delimitation part. The outer delimitation part includes a continuously curved shape. The inner delimitation part includes two or more planar inner delimitation part components, which are each connected to one another at one edge to form a connection edge, and the connection edge is configured to be attached to the outer delimitation part. A type of framework structure is thus provided, which causes increased stability and can split impacting objects in particular if two inner delimitation part components are used on the vehicle tail section component or wing section component.

12 Claims, 3 Drawing Sheets

(56) References Cited

U.S. PATENT DOCUMENTS

| | | | |
|---|---|---|---|
| 2,836,267 A * | 5/1958 | Reinhold | 52/404.1 |
| 3,429,023 A | 2/1969 | Blythe et al. | |
| 5,263,667 A * | 11/1993 | Horstman | 244/209 |
| 5,366,177 A * | 11/1994 | DeCoux | 244/201 |
| 7,152,892 B2 * | 12/2006 | Rechberg | 292/304 |
| 8,746,619 B2 * | 6/2014 | Li et al. | 244/121 |
| 2007/0138340 A1 * | 6/2007 | Arafat et al. | 244/121 |
| 2007/0221788 A1 * | 9/2007 | Meister | 244/208 |
| 2009/0020653 A1 | 1/2009 | Schrauf | |
| 2010/0059623 A1 * | 3/2010 | Cazals et al. | 244/46 |
| 2010/0148006 A1 * | 6/2010 | Olmi et al. | 244/121 |

* cited by examiner

AIR SUCKING VEHICLE TAIL SECTION COMPONENT OR WING SECTION COMPONENT, METHOD FOR PRODUCING AN AIR SUCKING VEHICLE TAIL SECTION COMPONENT AND A WING SECTION COMPONENT AND A VEHICLE, ESPECIALLY AN AIRCRAFT, WITH AN AIR SUCKING VEHICLE TAIL SECTION COMPONENT OR WING SECTION COMPONENT

CROSS-REFERENCE TO RELATED APPLICATIONS

This is a continuation of International Application No. PCT/EP2011/064226 filed on Aug. 18, 2011, which claims priority of German Patent Application No. 10 2010 036 154.2, filed Sep. 2, 2010 and U.S. Provisional Patent Application No. 61/379,509, filed Sep. 2, 2010, the disclosure of which applications is hereby incorporated herein by reference in their entirety.

TECHNICAL FIELD

The invention relates to an air-sucking vehicle tail section component or wing section component having an outer delimitation part and an inner delimitation part, a method for producing such an air-sucking vehicle tail section component or wing section component, as well as a vehicle, in particular an aircraft, having an air-sucking vehicle tail section component or wing section component.

BACKGROUND OF THE INVENTION

Vehicles which achieve high relative velocities to the air are preferably designed as aerodynamically favorable to reduce the aerodynamic drag and thus to increase their efficiency. From certain velocity ranges, it can be observed that turbulent boundary layers are generated at higher velocities on surfaces of vehicle fuselage components which protrude directly into the airflow, because of the flow deflection, for example, on leading edges of tail units or wing units of aircraft. The design of these aerodynamic components to reduce the increased aerodynamic drag caused by the boundary layers is not entirely variable because of installation space or functional restrictions connected thereto, however. To reduce the aerodynamic drag because of the turbulent boundary layer, concepts therefore exist of sucking air from areas of tail units and wing units of aircraft which are oriented upstream to reduce the aerodynamic drag, which are currently used only in research aircraft or vehicles, however. The affected vehicle fuselage component is implemented in the form of a tail unit or wing unit front edge having suction openings, which extend from a front delimitation oriented upstream, such as a front edge, up to a front spar of the structure of the tail unit or the wing unit.

In research aircraft in which such sucking of air from a turbulent boundary layer occurs via a vehicle fuselage component having openings, the relevant vehicle fuselage component is typically implemented as a double-walled structure, which is formed by an outer plate and an inner plate. These plates have a constant spacing to one another and are connected to one another by strip-like or tape-like webs. Multiple suction chambers thus result, from which air can be suctioned via the suction openings of the outer plate by applying a partial vacuum or suction. In order to achieve sufficient stiffness of the vehicle fuselage components modified in the above-mentioned way, which must at least correspond to the stiffness of a typical and non-sucking vehicle fuselage component without such suction, a greater plate thickness is necessary or additional stiffening ribs must be introduced, which results in an increased weight of the air-sucking vehicle fuselage component.

In such vehicle fuselage components, in particular in the case of use on aircraft, a low bird strike tolerance results, since the outer plate of the vehicle fuselage component has a weakening of the material because of the suction openings, so that significant denting results upon the impact of birds or other objects, so that the configuration of suction chambers located behind it or even a front spar may be damaged.

EP 1 699 686 A1 and US 2009/0020653 A1 disclose a device for sucking a boundary layer on the surface of an aircraft, in which the suctioned air is supplied to an environmental control system.

BRIEF SUMMARY OF THE INVENTION

According to a first aspect, an air-sucking vehicle tail section component or wing section component is provided which has an outer delimitation part and an inner delimitation part, the outer delimitation part and the inner delimitation part being connected to one another in a positive-fit, force-fit, or materially-bonded way employing connecting elements, by welding, gluing, or soldering. The outer delimitation part has a continuously curved shape, while the inner delimitation part is constructed from at least two flat delimitation part components, which are connected to one another to form a connection edge, which is connected to the outer delimitation part on an inner side thereof. The inner delimitation part has a fluid connection to the outer delimitation part and forms a suction chamber on an inner side, from which air can be centrally suctioned by attaching an air line, the air flowing in through the perforation of the outer delimitation part from its front edge. Through the use of flat inner delimitation part components, a type of framework structure is formed, which, in addition to providing the suction chambers, very effectively supports the outer delimitation part. Loads acting on the outer delimitation part are thus essentially introduced by the inner delimitation part components, in the form of compression and tension forces having force vectors oriented toward the extension planes of the inner delimitation part components, into the adjoining structure, such as a front spar. Through the supporting action, the material thickness of the outer delimitation part can be selected having a tendency to be less than would be possible using the above-described design from the prior art. This design of a vehicle tail section component or wing section component according to the invention accordingly has a significant weight advantage over the prior art.

Through the connection of two or more flat inner flat delimitation part components to form one or more connection edges, which are connected to the outer delimitation part, one or more cutting or cleaving edges form upon the impact of birds or other objects on the front edge of the outer delimitation part after its initially occurring deformation, so that the incident birds or other objects are split apart by a cutting or cleaving action on the front edge of the vehicle section component or wing section component according to the invention and thus moved in individual parts are around the affected vehicle tail section component or wing section component, without performing a conversion of all of the kinetic energy into plastic deformation energy on the outer delimitation part and the structure located behind it. If two inner delimitation part components are used, a wedge-like structure especially results, having an acute angle which induces a particularly good splitting action. This is a significant advantage over the above-described design from the prior art.

The air-sucking vehicle tail section component or wing section component according to an embodiment of the invention may have a lower weight in comparison to known air-sucking vehicle tail section components or wing section components. Furthermore, the vehicle tail section component or wing section component according to an embodiment of the invention may have improved bird strike tolerance and in particular can prevent the damage of a front spar produced from a fiber composite material.

In an embodiment, the angle enclosed between the inner delimitation part components in the area of the front edge of the outer delimitation part is an acute angle, which is preferably in a range from 20 to 60°.

In an embodiment, the outer delimitation part has a convex shape having a front edge oriented upstream, the inner delimitation part being implemented from two delimitation part components, which are connected to one another on two front edges to form a connection edge, and are spaced apart from one another on the two opposing rear edges, both the connection edge and also the rear edges being connected to the outer delimitation part, so that a triangle results within the outer delimitation part, which is connected at all corners to the outer delimitation part and forms the suction chamber in its interior. Depending on the selection of the dimensions and the spacing of the rear edges and thus the enclosed angle of the two inner delimitation part components, a more or less pronounced stiffness of the vehicle tail section component or wing section component according to the invention is achieved, which is to be optimized as a function of the design of the outer delimitation part and the cutting/splitting action of the inner delimitation part components.

According to an embodiment of the invention, the outer delimitation part has a microperforation, which comprises boreholes having a diameter of 50 μm, for example. Due to this very small diameter, the global flow behavior of the vehicle tail section component or wing section component according to the invention is influenced as little as possible during movement of the vehicle without sucking of the air from the boundary layer.

In an embodiment, the boreholes can have a constant spacing from a fraction of a millimeter up to several millimeters to one another, so that overall the greatest possible suction cross-section is provided.

In an embodiment, the inner delimitation part and the outer delimitation part are connected to one another via webs. The webs may be implemented as tape-like components, which may extend perpendicularly from the inner delimitation parts to the inner side of the outer delimitation part, or alternatively thereto also perpendicularly to a profile chord or another suitable extension dimension of the affected vehicle tail section component or wing section component. The dimensions of the webs differ from one another, in particular in height, because of the differing shaping of the outer delimitation part and the inner delimitation part. A type of honeycomb structure based on the outer delimitation part and the inner delimitation part is generated by the use of webs.

According to an embodiment, the inner delimitation part has a plurality of suction boreholes, which have fluid connections to the perforation boreholes of the outer delimitation part. The fluid connection can be implemented via the provided suction chambers between the outer delimitation part and the inner delimitation part, the suction boreholes of the inner delimitation part components being able to be selected as larger than those of the outer delimitation part components. Boreholes having diameters of greater than 5 mm may advantageously be used, boreholes having a diameter of 5-10 mm preferably being used as a function of the required suction volume stream to prevent an unnecessarily high flow resistance.

In an embodiment if connecting webs are used, the inner delimitation part components have multiple rows of suction openings positioned parallel to one another, these rows corresponding to the intermediate spaces defined by the connecting webs. This means that a row of suction boreholes is positioned on an inner delimitation part component so that the suction boreholes extend in the intermediate space of two webs.

In an embodiment, the vehicle tail section component or wing section component according to the invention is implemented as an integral part, which allows connecting tabs for connecting the vehicle tail section component or wing section component according to the invention to a vehicle structure. These tabs may be implemented on the outer delimitation part, for example, which has boreholes for producing positive-fit or force-fit connections, e.g., rivet or screw connections. The inner delimitation part components particularly preferably extend from the front edge of the outer delimitation part only in an area directly upstream from these connecting tabs, where they form a connection to the outer delimitation part.

To provide a suction function, the suction chamber is connected at one or more points to an air suction device, the connection preferably being able to be turned off via a valve. The air suction device may be implemented in the form of an air line, which is connected to a fan, a suction pump, or other suitable devices. The air suction device is preferably positioned directly in the affected vehicle component or in an adjacent vehicle component, in order to reduce the required line length for the suction.

In summary, the vehicle tail section component or wing section component according to the invention has a framework-like structure, which has a greater stiffness than frame wing units at a cross-section equal in comparison to typical vehicle tail section components or wing section components, since only tension and pressure forces and no bending torques act here. Therefore, the deformations and the mechanical stresses are less than in previously known solutions. Furthermore, the flat inner delimitation part components form a structure which offers substantially better protection against bird strike.

Further, an air-sucking vehicle tail section component or wing section component and a vehicle comprising such a component are disclosed.

Finally, a production method for producing such an air-sucking vehicle tail section component or wing section component is disclosed. The production method according to an aspect of the invention may include the manufacturing of multiple inner delimitation part components and one outer delimitation part, a right and a left part also being able to be manufactured, which may then be connected to one another in the middle by a positive-fit, force-fit, or materially-bonded connection method.

DETAILED DESCRIPTION

Figure 1:
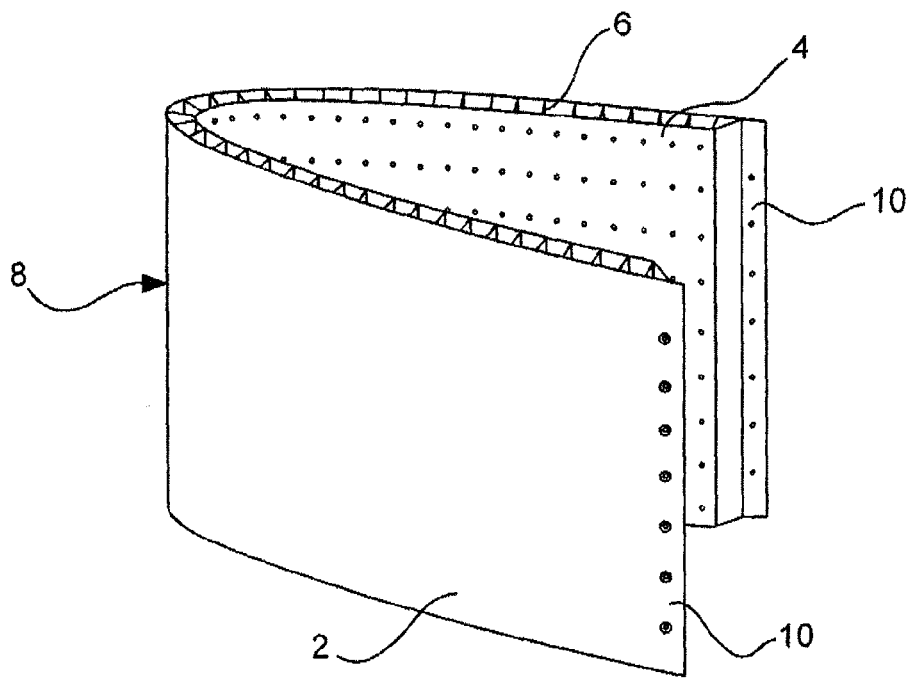
FIG. 1 shows a vehicle tail section component or wing section component with suction according to the prior art.

FIG. 1 shows a vehicle tail section component or wing section component according to the prior art. This vehicle tail section component or wing section component essentially comprises an outer delimitation part 2, an inner delimitation part 4, and a plurality of connecting webs 6. The outer delimitation part 2 and the inner delimitation part 4 are designed as continuously curved and further are positioned equidistant to one another. This has the result that all connecting webs 6 have the same web height.

The outer delimitation part 2 comprises a microperforation, while the inner delimitation part 4 has a plurality of larger suction boreholes, which have a fluid connection to the boreholes of the microperforation of the outer delimitation part 2.

Furthermore, the inner delimitation part 4 extends from a leading edge 8 of the outer delimitation part to only up to in front of connecting tabs 10, which are formed on the ends of the outer delimitation part 2 opposite to the leading edge 8, a front spar (not shown in the figures) of the vehicle structure being located later between the connecting tabs 10.

Figure 2:
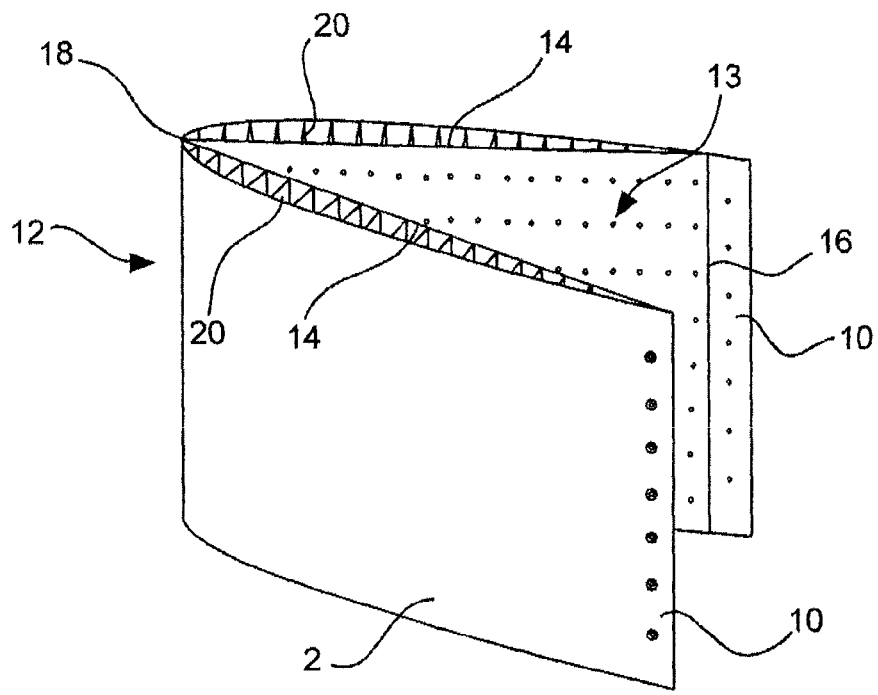
FIG. 2 shows a vehicle tail section component or wing section component according to an embodiment of the invention.

FIG. 2 shows a vehicle tail section component or wing section component 12 according to an embodiment of the invention, which also has an outer delimitation part 2 and an inner delimitation part 13, which is constructed from two flat inner delimitation part components 14. These two inner delimitation part components 14 each have a rear edge 16 and a front edge opposite to the rear edge 16, the front edges being connected to one another to form a connection edge 18, while the rear edges 16 are positioned spaced apart from one another. The connection edge 18 is connected to the outer delimitation part 2, in that the connection edge 18 is connected to the outer delimitation part 2 on the inner side of the leading edge or front edge 8. In this way, the spacing between the outer delimitation part 2 and the inner delimitation part is not uniform. All connecting webs 20 used for connecting the inner delimitation part components 14 and the outer delimitation part 2 have different web heights.

Due to this non-equidistant configuration and the flat design of the inner delimitation part components 14, however, a framework-like structure is formed, through which a force engaging on the front edge 8 in the form of compression forces runs parallel to the extension planes of the inner delimitation part components 14, is absorbed, and is conducted directly into the connecting tabs of the outer delimitation part 2 and thus a structure. This framework-like construction is accordingly particularly advantageous for absorbing lateral loads on the vehicle tail section component or wing section component 12 according to the invention. Through the advantageous design, the outer delimitation part 2 and the inner delimitation part 13 can have lesser material thicknesses than previously known vehicle tail section components or wing section components, for example, the air-sucking vehicle fuselage component having an equidistant configuration as in FIG. 1.

The angle between the two inner delimitation part components 14 is acute in the case shown, so that a type of cutting or cleaving edge results on the connection edge 18, so that birds or other objects impacting the front edge 8 of the outer delimitation part are actually split apart, after an initial deformation of the outer delimitation part 2, because of the cleaving action of the connection edge 18. After splitting, all of the kinetic energy does not have to be converted completely into plastic deformation energy, so that particularly outstanding bird strike protection is thus provided.

The inner delimitation part components 14 can be manufactured from arbitrary suitable materials and do not necessarily have to comprise the same material as the outer delimitation part 2. Titanium, steel, aluminum, Glass Reinforced Plastic (GRP), and Carbon Fiber Reinforced Plastic (CFRP) are mentioned solely as examples here, especially CFRP, aluminum alloys, and titanium suggesting themselves in aircraft construction in particular, which can further be attached particularly easily by material bonding methods to the outer delimitation part 2.

Figure 3:
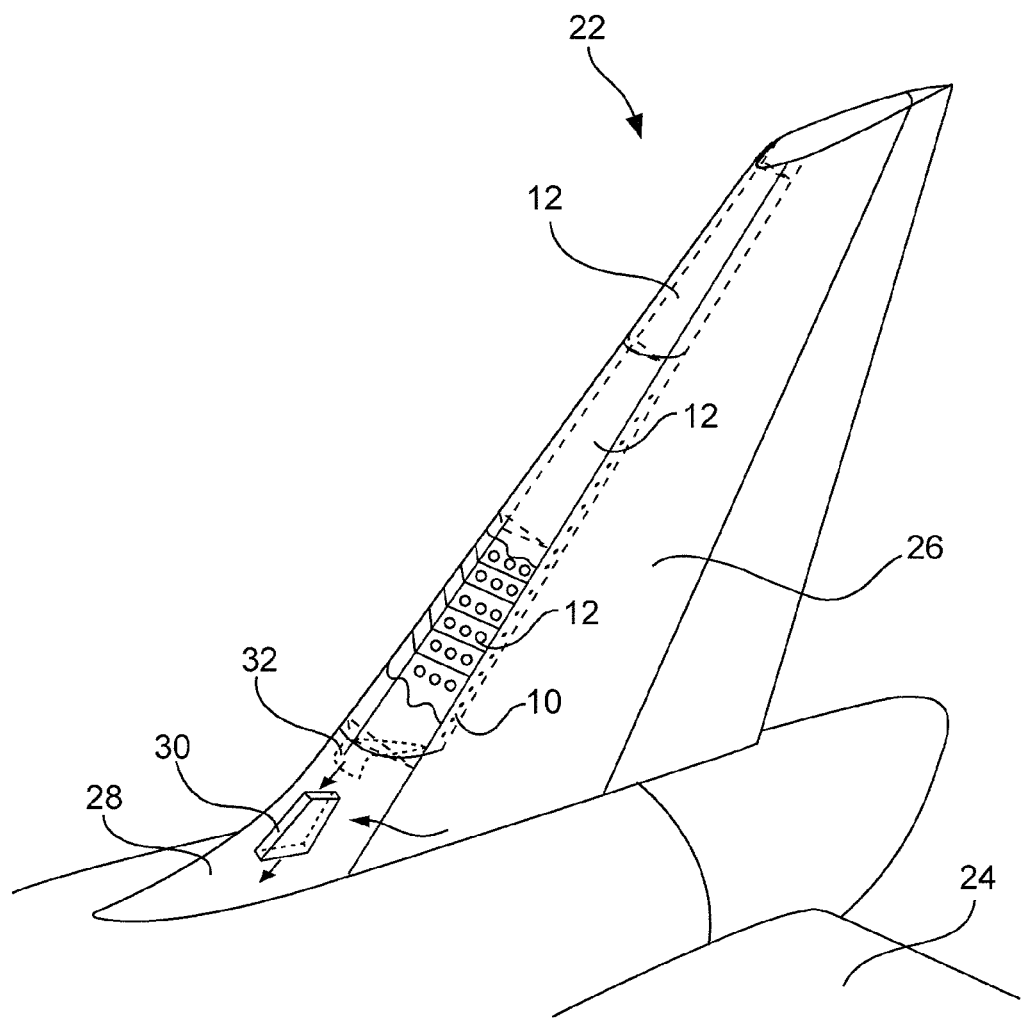
FIG. 3 shows a section of an aircraft having multiple vehicle tail section components or wing section components according to an embodiment of the invention positioned thereon.

FIG. 3 shows a tail section 22 of a commercial aircraft, which has lateral tail units 24 and a vertical tail unit 26. Multiple vehicle tail section components or wing section components 12 according to the invention are positioned as examples on a leading edge of the lateral tail unit 26 oriented upstream, in which suction of air from a turbulent boundary layer is made possible, the weight is simultaneously reduced in comparison to known solutions, and the effects of bird strike or other objects are decreased.

The suction chambers of the individual vehicle tail section components or wing section components according to the invention can be connected to one another in the illustration shown such that a continuous, oblong suction channel results, from which air can be suctioned at a central point. For example, a leading edge section 28, in which an air suction device 30 is positioned, which is connected via an air line 32 to the suction chamber of the lowermost vehicle tail section component or wing section component, is positioned in FIG. 3 on the lower side of the lateral tail unit 22. The suction chambers of the successive vehicle tail section components or wing section components on top can be connected via a seal or short air line sections to the suction chambers located underneath.

Air which is suctioned from the suction chambers may be used for cooling devices, in particular electronic devices, located close by. Alternatively thereto, the suctioned air may be discharged opposite to the flight direction to increase the thrust or alternatively may be provided to an environmental control system.

It is to be noted here that the vehicle tail section component or wing section component according to an embodiment of the invention can be used not only for tail units, but rather also for wings of an aircraft, and is not to be reduced to the exemplary embodiments shown. In particular in the case of use on a wing, in whose immediate proximity a mixing chamber of a climate control system is frequently located, relaying the suctioned air into the mixing chamber or another component of an environmental control system suggests itself.

Figure 4:
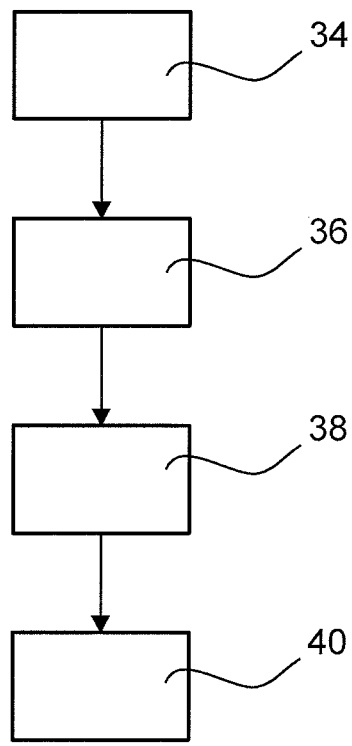
FIG. 4 shows a schematic block diagram of a production method according to an aspect of the invention for a vehicle tail section component or wing section component according to an embodiment of the invention.

Finally, FIG. 4 shows an exemplary illustration of a production method according to an aspect of the invention, which essentially comprises the steps of producing 34 multiple inner delimitation part components, producing 36 one outer delimitation part component, connecting 38 the inner delimitation part components 14 to the outer delimitation part 2, and preferably also situating 40 the produced component on an aircraft.

In addition, it is to be noted that "having" does not exclude other elements or steps and "a" or "one" does not exclude multiples. Furthermore, it is to be noted that features which

LIST OF REFERENCE NUMERALS 2 outer delimitation part
4 inner delimitation part
6 connecting web
8 leading edge/front edge
10 connecting tab
12 vehicle tail section component or wing section component
13 inner delimitation part
14 inner delimitation part component
16 rear edge
18 connection edge
20 connecting web
22 tail section
24 lateral tail unit
26 vertical tail unit
28 leading edge section
30 air suction device
32 air line
34 producing multiple inner delimitation part components
36 producing one outer delimitation part component
38 connecting the inner delimitation part components to the outer delimitation part component
40 situating the produced section on an aircraft

The invention claimed is:

1. An air-sucking vehicle tail section component or wing section component, having
   an outer delimitation part having microperforation comprising boreholes,
   an inner delimitation part having a plurality of suction boreholes comprising fluid connections to the microperforation boreholes, and
   a plurality of connecting webs,
      wherein the inner delimitation part is connected via the plurality of connecting webs to the outer delimitation part,
      wherein the outer delimitation part comprises a continuously curved shape,
      wherein the inner delimitation part is constructed from two or more planar inner delimitation part components connected to one another on one edge each to form a connection edge, the connection edge being attached to the outer delimitation part, and
      wherein each of the planar inner delimitation part components extends from a front edge of the outer delimitation part such that the connection edge is formed on an inner side of the front edge.

2. An air-sucking vehicle tail section component or wing section component comprising:
   an outer delimitation part;
   an inner delimitation part; and
   a plurality of connecting webs,
      wherein the inner delimitation part is connected via the plurality of connecting webs to the outer delimitation part,
      wherein the outer delimitation part comprises a continuously curved shape,
      wherein the inner delimitation part is constructed from two or more planar inner delimitation part components connected to one another on one edge each to form a connection edge, the connection edge being attached to the outer delimitation part,
      wherein each of the planar inner delimitation part components extends from a front edge of the outer delimitation part such that the connection edge is formed on an inner side of the front edge, and
      wherein the outer delimitation part has microperforation comprising boreholes having a diameter between 25 and 100 μm.

3. The air-sucking vehicle tail section component or wing section component according to claim 2, wherein the microperforation boreholes comprise a constant spacing to one another in a range from 0.1 mm to 10 mm.

4. The air-sucking vehicle tail section component or wing section component according to claim 1, wherein the plurality of connecting webs has different heights.

5. An air-sucking vehicle tail section component or wing section component comprising:
   an outer delimitation part;
   an inner delimitation part; and
   a plurality of connecting webs,
      wherein the inner delimitation part is connected via the plurality of connecting webs to the outer delimitation part,
      wherein the outer delimitation part comprises a continuously curved shape,
      wherein the inner delimitation part is constructed from two or more planar inner delimitation part components connected to one another on one edge each to form a connection edge, the connection edge being attached to the outer delimitation part,
      wherein each of the planar inner delimitation part components extends from a front edge of the outer delimitation part such that the connection edge is formed on an inner side of the front edge, and
      wherein the inner delimitation part components comprise a plurality of rows of suction boreholes positioned parallel to one another, wherein the rows correspond to intermediate spaces formed by the plurality of connecting webs.

6. The air-sucking vehicle tail section component or wing section component according to claim 1, wherein the planar inner delimitation part comprises first and second inner delimitation part components enclosing an acute angle to one another.

7. The air-sucking vehicle tail section component or wing section component according to claim 6, wherein the angle is in a range from 20° to 60°.

8. The air-sucking vehicle tail section component or wing section component according to claim 1, wherein the vehicle tail section component or wing section component is configured as an integral part and comprises a plurality of connecting tabs for connection to a vehicle structure.

9. An air-sucking vehicle tail section component or wing section component comprising:
   an outer delimitation part;
   an inner delimitation part; and
   a plurality of connecting webs,
      wherein the inner delimitation part is connected via the plurality of connecting webs to the outer delimitation part,
      wherein the outer delimitation part comprises a continuously curved shape,
      wherein the inner delimitation part is constructed from two or more planar inner delimitation part components connected to one another on one edge each to form a connection edge, the connection edge being attached to the outer delimitation part, wherein each of the planar inner delimitation part components extends from a front edge of the outer delimitation part such that the connection edge is formed on an inner side of the front edge, and wherein one or more suction chambers are formed between the inner delimitation part and the outer delimitation part, which suction chambers are connectable to a suction unit for sucking air from a turbulent boundary layer on the outer delimitation part.

10. A vehicle having at least one air-sucking tail section component or wing section component, the at least one vehicle tail section component or wing section component comprising:

an outer delimitation part having microperforation comprising boreholes, an inner delimitation part having a plurality of suction boreholes comprising fluid connections to the microperforation boreholes, and a plurality of connecting webs, wherein the inner delimitation part is connected via the plurality of connecting webs to the outer delimitation part, wherein the outer delimitation part comprises a continuously curved shape, wherein the inner delimitation part is constructed from two or more planar inner delimitation part components connected to one another on one edge each to form a connection edge, the connection edge being attached to the outer delimitation part, and wherein each of the planar inner delimitation part components extends from a front edge of the outer delimitation part such that the connection edge is formed on an inner side of the front edge.

11. The vehicle according to claim 10, wherein the vehicle is an aircraft and the air-sucking vehicle tail section component or wing section component is positioned on at least one of a tail unit and a wing unit.

12. A method for producing an air sucking vehicle tail section component or wing section component, comprising:

producing two or more planar inner delimitation part components having a plurality of suction boreholes, producing one outer delimitation part having a continuously curved shape and microperforation comprising boreholes, and connecting the inner delimitation part components while forming at least one connection edge to the outer delimitation part via a plurality of connecting webs such that each of the planar inner delimitation part components extends from a front edge of the outer delimitation part and such that the connection edge is formed on an inner side of the front edge.

* * * * *